United States Patent [19]

Jowang

[11] Patent Number: 5,161,069
[45] Date of Patent: Nov. 3, 1992

[54] CURVILINEAR MOTION TYPE OPTICAL FILTER DRIVING MECHANISM

[75] Inventor: Fu Jowang, Hsin chu, Taiwan

[73] Assignee: Tamarack Telecom Inc., Taiwan

[21] Appl. No.: 733,184

[22] Filed: Jul. 19, 1991

[51] Int. Cl.[5] .......................... G02B 5/20; G02B 26/00
[52] U.S. Cl. .................................... 359/889; 359/891; 359/892
[58] Field of Search .................. 359/889, 891, 892

[56] References Cited

U.S. PATENT DOCUMENTS 4,943,142  7/1990  Fay et al. ........................ 359/889

Primary Examiner—Carolyn E. Fields
Attorney, Agent, or Firm—Bacon & Thomas

[57] ABSTRACT

A curvilinear motion type optical filter driving mechanism, comprising a lens-house, a filter holder, a motor, a driven gear, and a driving gear. The filter holder has an optical filter mounted thereon at the front and disposed in a curvilinear direction, and a rack at the back. Rotating the motor causes the drive gear to carry the optical filter, via the driven gear and the rack, to make a curvilinear motion over the lens of the lens-house.

1 Claim, 4 Drawing Sheets

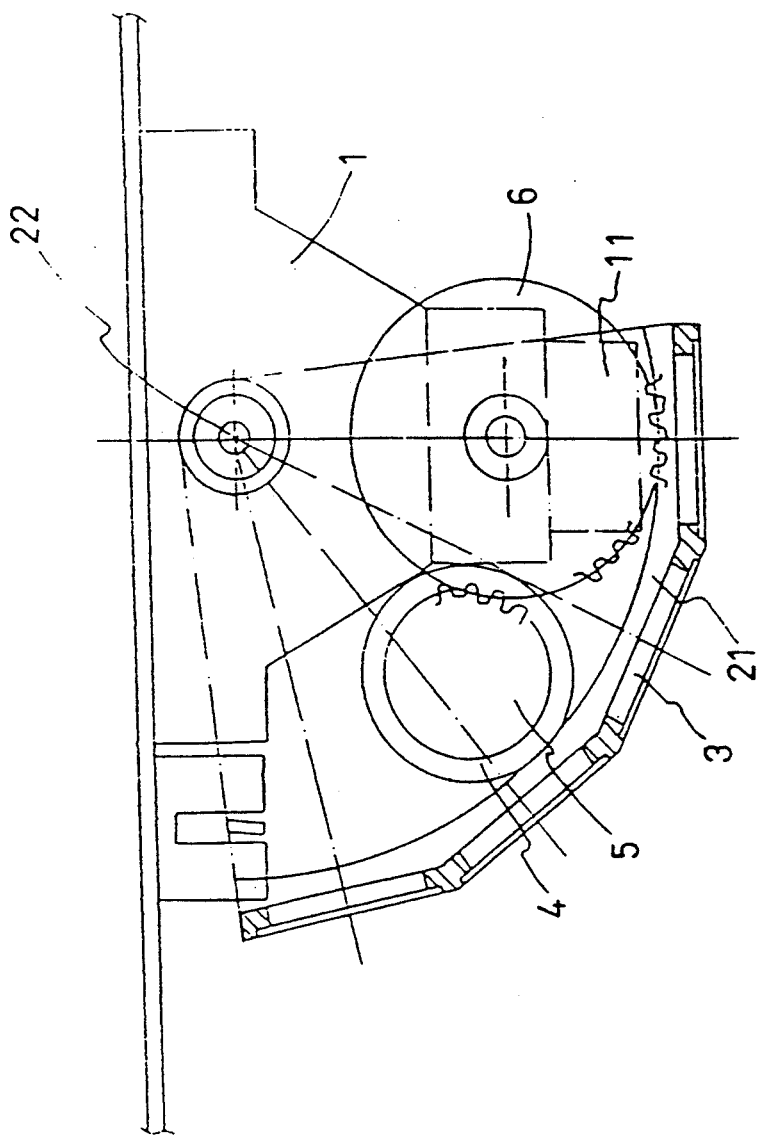
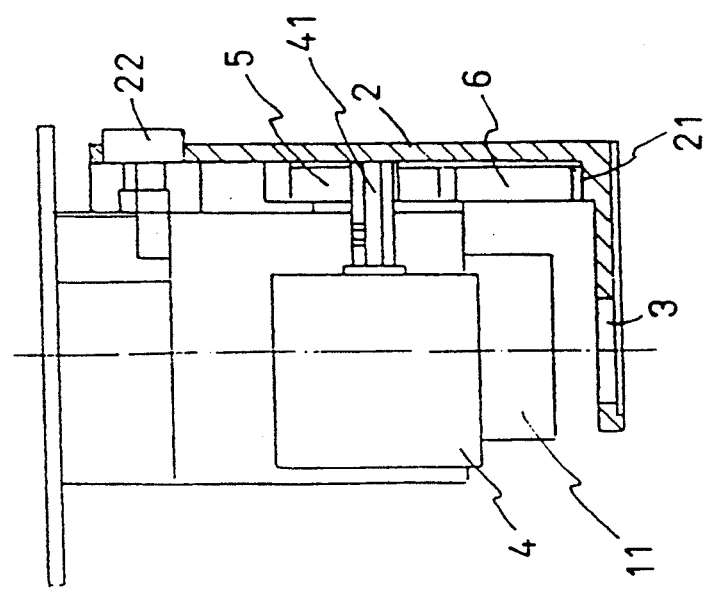

CURVILINEAR MOTION TYPE OPTICAL FILTER DRIVING MECHANISM

BACKGROUND OF THE INVENTION

The present invention relates to optical filter driving mechanisms and relates more particularly to an optical filter driving mechanism to drive an optical filter to move in curvilinear direction.

Conventional optical filter driving mechanism is generally operated through belt transmission. Disadvantage of this conventional optical filter driving mechanism is that the driving belt may be caused to deform easily, due to the gravity and the inertia of the filter frame. If the driving belt is deformed during driving operation, the optical filter will vibrate when it is carried to move in front of lens. Further, because the optical filter is driven to make a reciprocating, linear motion, the extended size of the filter frame occupies much space and, a wider space must be prepared for the linear motion of the optical filter. For example, if the optical filter is consisted of 4 pieces of filter at the front of lens 11 of lens-house 1 as shown in FIG. 1, the total track of the filter frame must be wider than the length of filter frame 2 and, a space wider than the total length of 7 pieces of filter must be provided for the reciprocating motion of the optical filter 3.

SUMMARY OF THE INVENTION

The present invention has been accomplished to eliminate the aforesaid problems. It is therefore an object of the present invention to provide an optical filter driving mechanism which drives an optical filter to make a curvilinear motion during a filter selection operation.

It is another object of the present invention to provide an optical filter driving mechanism which reduces space occupation during operation.

It is still another object of the present invention to provide a gear driving mechanism which is stable in use.

BRIEF DESCRIPTION OF THE DRAWINGS

FIG. 3 is a sectional assembly view of the preferred embodiment of the optical filter driving mechanism of the present invention;

FIG. 4 is a schematic top view of the preferred embodiment of the optical filter driving mechanism of the present invention.

DETAILED DESCRIPTION OF THE PREFERRED EMBODIMENT

Figure 1:
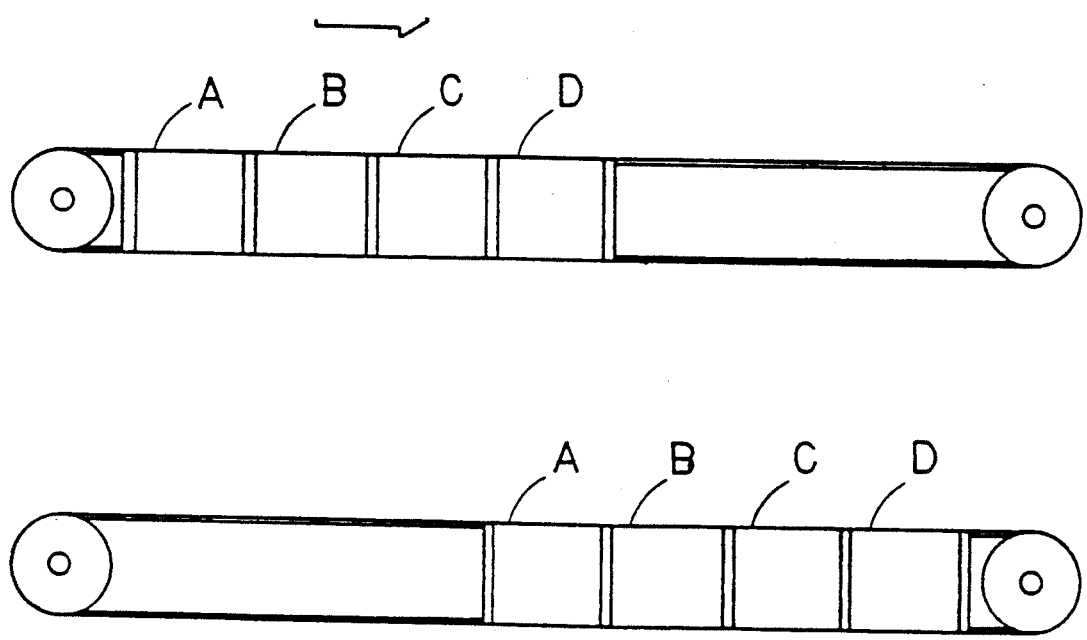
FIG. 1 illustrates the linear, reciprocating moving course of an optical filter driven by a conventional driving mechanism according to the prior art.
Figure 2:
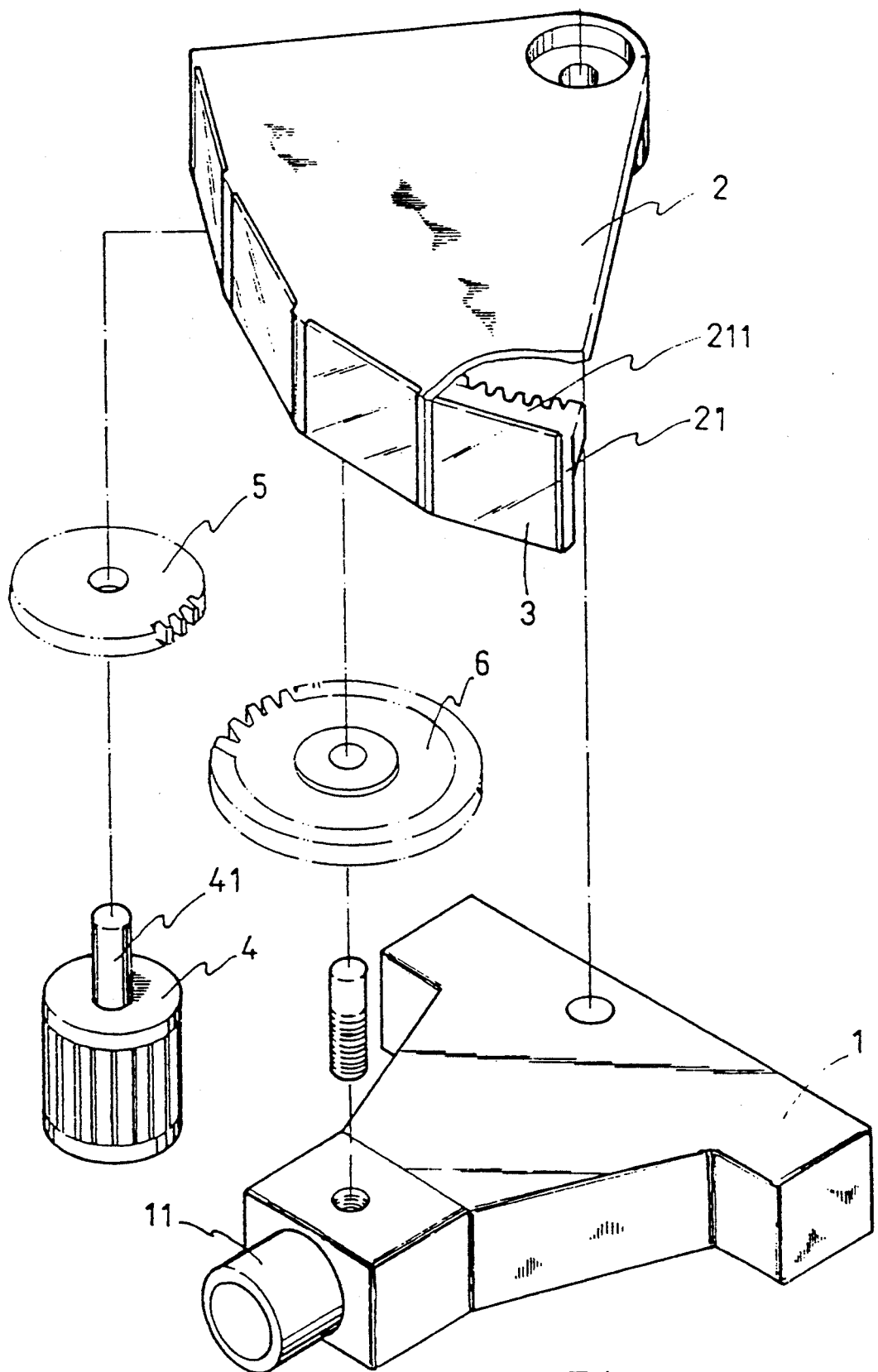
FIG. 2 is an exploded perspective view of the preferred embodiment of the optical filter driving mechanism of the present invention.

Referring to FIG. 2, therein illustrated is the preferred embodiment of the optical filter driving mechanism of the present invention which is generally comprised of a lens-house 1, a fan-shaped filter holder 2, an optical filter 3 including a series of filters, a motor 4, a drive gear 5 and a driven gear 6. The drive gear 5 is mounted on the output shaft 41 of the motor 4 and engaged with the driven gear 6. The driven gear 6 is mounted on the lens-house 1 at the top and driven to rotate around a pivot pin 22 by the motor 4 via the drive gear 5. The filter holder 2 comprises an elongated, curved rack 21 below the front edge. During assembly process, the filter holder 2 is mounted on the lens-house 1 by the pivot pin 22 at a suitable location with the rack 21 engaged with the driven gear 6, permitting the optical filter 3 to be disposed in front of the lens 11.

Figure 5:
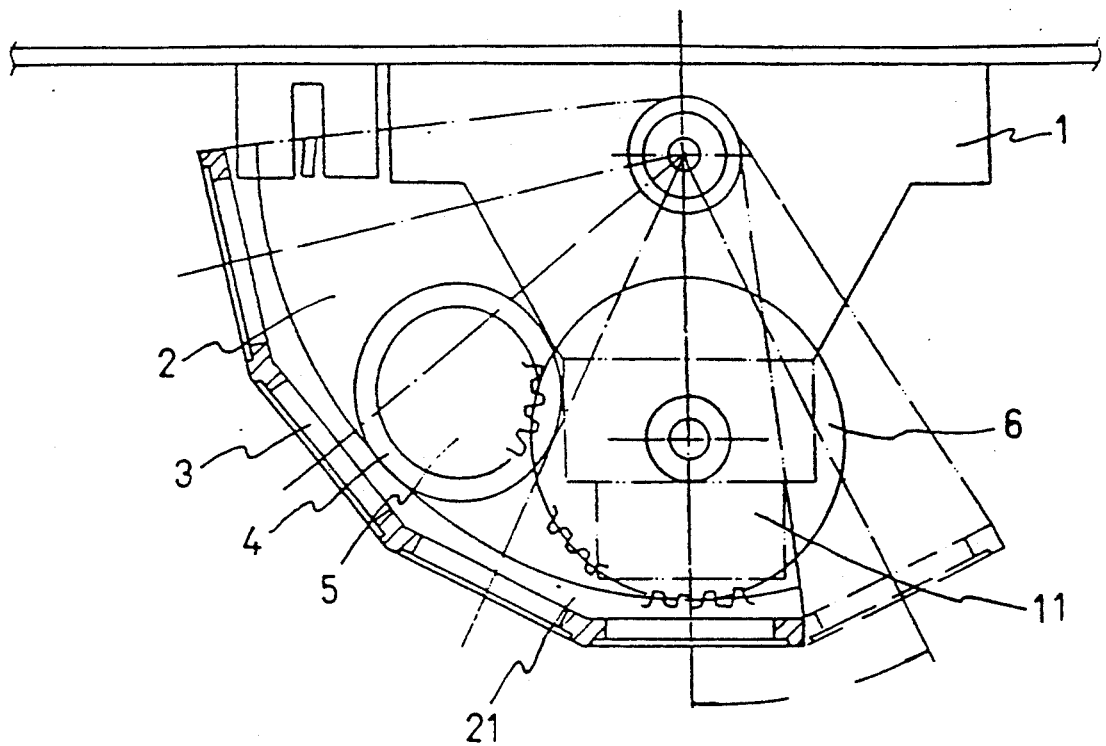
FIG. 5 is a schematic drawing showing the operation of the present invention in driving the optical filter 3 to make a curvilinear motion.

Referring to FIGS. 3 through 5, turning on the motor 4 causes the drive gear 5 to drive the driven gear 6 to rotate. Because the driven gear 6 is simultaneously engaged with the rack 21 so the optical filter 3 will make a curvilinear motion in front of the lens 11 of the lens-house 1. Because the optical filter is driven to make a curvilinear motion by means of gear power transmission, it does not vibrate while moving, and therefore, better performance is achieved.

What is claimed is:

1. An optical filter assembly including a driving mechanism, comprising:

a lens-house having a lens at the front;

a filter holder mounted on said lens-house at the top, said filter holder having a curved rack below a front edge of the filter holder;

an optical filter fixedly mounted on said filter holder and disposed in front of said lens;

a motor having an output shaft;

a drive gear driven by said output shaft of said motor;

a driven gear mounted on said lens-house at the top end engaged between said drive gear and said rack; and characterized in that rotating said motor causes said drive gear to carry said optical filter, via said driven gear and said rack, to make a curvilinear motion over said lens.

* * * * *